(12) United States Patent
Kim et al.

(10) Patent No.: US 7,755,073 B2
(45) Date of Patent: Jul. 13, 2010

(54) ACOUSTO-OPTIC FILTER AND OPTICAL CDMA SYSTEM USING THE SAME

(75) Inventors: Bong Kyu Kim, Daejeon (KR); Sang Jo Park, Cheongju (KR); Heuk Park, Daejeon (KR); Kwang Joon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 12/361,522

(22) Filed: Jan. 28, 2009

(65) Prior Publication Data
US 2009/0196614 A1 Aug. 6, 2009

Related U.S. Application Data

(62) Division of application No. 11/593,909, filed on Nov. 6, 2006, now abandoned.

(30) Foreign Application Priority Data
Nov. 17, 2005 (KR) .................. 10-2005-0110359

(51) Int. Cl.
*H04J 14/00* (2006.01)
(52) U.S. Cl. ................ 250/566; 250/216; 250/227.24; 385/7; 398/77
(58) Field of Classification Search ................ 250/216, 250/226, 227.24, 566, 231.13; 398/77, 78, 398/140; 385/7, 28, 29, 39
See application file for complete search history.

(56) References Cited

U.S. PATENT DOCUMENTS 6,021,237 A * 2/2000 Kim et al. .................. 385/28

| | | | |
|---|---|---|---|
| 6,504,969 B1 | 1/2003 | Tsao et al. | |
| 6,614,950 B2 | 9/2003 | Huang et al. | |
| 6,621,968 B1 * | 9/2003 | Koh et al. | 385/123 |
| 2004/0081463 A1 | 4/2004 | Kim et al. | |
| 2004/0197107 A1 * | 10/2004 | Fathallah | 398/190 |

OTHER PUBLICATIONS

"Programmable fiber Bragg gratings for spectral CDMA" by P. Boffi et al.; *CLEO* 2000; pp. 578-579; May 12, 2000.
"Radio-Over-Fiber System Using Fiber-Grating-Based Optical CDMA With Modified PN Codes" by Bong Kyu Kim et al.; *IEEE Photonics Technology Letters*, vol. 15, No. 10, Oct. 2003; pp. 1485-1487.
"All-fiber acousto-optic frequency fiber" by B.Y. Kim et al.; *Optics Letters*, Jun. 1986, vol. 11, No. 6; pp. 389-391.
"All-fiber tunable filter and laser based on two-mode fiber" by Seok Hyun Yun, et al.; *Optics Letters*, Jan. 1, 1996, vol. 21, No. 1; pp. 27-29.

* cited by examiner

*Primary Examiner*—Kevin Pyo
(74) *Attorney, Agent, or Firm*—Blakely, Sokoloff, Taylor & Zafman

(57) ABSTRACT

Provided are an acousto-optic filter and an optical code division multiple access (CDMA) system using the acousto-optic filter. The acousto-optic filer includes: an acousto-optic mode converter (AOMC) converting an optical signal of a specific optical frequency corresponding to a frequency of an electric signal of an optical signal of a first mode having a predetermined optical frequency band; and a mode stripper (MS) stripping an optical signal of the optical signal of the first mode that has been converted to a second mode.

3 Claims, 3 Drawing Sheets wavelength $\omega_1, \omega_2 \quad \omega_4, \omega_5 \quad \cdots, \quad \omega_n$ wavelength

ACOUSTO-OPTIC FILTER AND OPTICAL CDMA SYSTEM USING THE SAME

The present patent application is a Divisional claiming the benefit of application Ser. No. 11/593,909, filed Nov. 6, 2006 now abandoned.

CROSS-REFERENCE TO RELATED PATENT APPLICATION

This application claims the benefit of Korean Patent Application No. 10-2005-0110359, filed on Nov. 17, 2005, in the Korean Intellectual Property Office, the disclosure of which is incorporated herein in its entirety by reference.

BACKGROUND OF THE INVENTION

1. Field of the Invention

The present invention relates to an optical code division multiple access (CDMA) encoder and/or decoder, and more particularly, to an acousto-optic filter used for an optical CDMA decoder and/or encoder and an optical CDMA system using the same.

2. Description of the Related Art

Conventional wavelength domain optical CDMA encoders and/or decoders mainly include fiber Bragg gratings (FBGs) or general diffraction gratings.

Optical CDMA encoders and/or decoders using general diffraction gratings divide light according to a wavelength using the general diffraction gratings, transmit or reflect optical signals having specific wavelengths, and sum the divided optical signals using the general diffraction gratings so as to perform encoding and/or decoding. Thus, the optical CDMA encoders and/or decoders have large volumes and complicated structures.

Optical CDMA encoders and/or decoders using FBGs arrange reflected wavelengths of optical filters including the FBGs using arbitrary signs so as to perform encoding and/or decoding. Thus, the optical CDMA encoders and/or decoders include several FBGs.

SUMMARY OF THE INVENTION

The present invention provides an acousto-optic filter applying several frequencies of an electric signal to arrange a spectrum of a transmitted wavelength with a specific code so as to encode and/or decode an optical signal.

The present invention also provides an optical CDMA system using an acousto-optic filter easily adjusting a channel depending on a variation in a frequency of an electric signal.

According to an aspect of the present invention, there is provided an acousto-optic filter used for an optical code division multiple access (CDMA) encoder, including: an acousto-optic mode converter (AOMC) converting an optical signal having a specific optical frequency corresponding to a frequency of an electric signal into a second mode, wherein the optical signal is one of signals of a first mode having a predetermined optical frequency band; and an mode stripper (MS) stripping the optical signal of the second mode.

According to another aspect of the present invention, there is provided an acousto-optic filter used for an optical CDMA decoder, including: an AOMC converting an optical signal having a specific optical frequency corresponding to a frequency of an electric signal into a second mode, wherein the optical signal is one of signals of a first mode having a predetermined optical frequency band; and a mode divider (MD) outputting the optical signal of the first mode and the optical signal of the second mode to different ports, respectively.

According to another aspect of the present invention, there is provided an optical CDMA system using an acousto-optic filter, including: at least one or more optical CDMA encoders outputting only an optical signal except an optical signal having a specific optical frequency corresponding to a frequency of an electric signal using an acousto-optic filter performing acousto-optic mode converting and mode stripping; an optical coupler coupling optical signals output from a plurality of optical CDMA encoders; and an optical CDMA decoder dividing the optical signals received from the optical coupler into a specific optical frequency corresponding to a predetermined frequency of an electric signal and outputting the divided optical signal using an acousto-optic filter performing acousto-optic mode converting and mode stripping.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an acousto-optic filter used for an optical CDMA encoder and/or decoder and an optical CDMA system according to the present invention will be described in detail with reference to the attached drawings.

Figure 1:
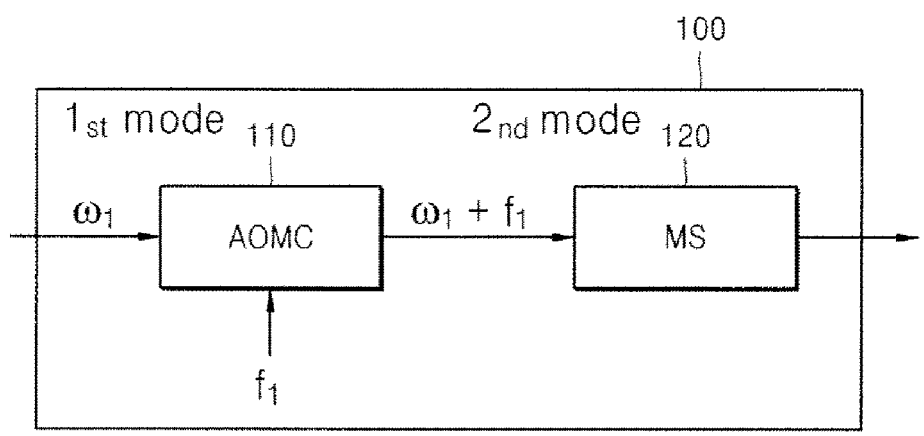
FIG. 1 is a view illustrating an acousto-optic filter used for an optical CDMA encoder according to an embodiment of the present invention.

FIG. 1 is a view illustrating an acousto-optic filter used for an optical CDMA encoder according to an embodiment of the present invention. Referring to FIG. 1, an acousto-optic filter 100 used for an optical CDMA encoder includes an acousto-optic mode converter (AOMC) 110 and a mode striper (MS) 120.

If light input to the AOMC 110 is a fundamental mode or a first mode having a light frequency and a frequency of an electric signal input to the AOMC 110 is $f_1$, the AOMC 110 outputs a second mode having a light frequency of $\omega_1 + f_1$.

Since the frequency $f_1$ is very smaller than a frequency $\omega_1$, an electric frequency component $f_1$ hardly affects a variation in the light frequency $\omega_1$. The AOMC 110 and the MS 120 are connected to each other through a dual mode optical fiber.

The MS 120 passes a fundamental mode and strips the second mode. Thus, if the light output from the AOMC 110 is input, the MS 120 does not transmit light having a light frequency of $\omega_1$.

In other words, the AOMC 110 does not frequency and mode convert all light frequencies or wavelengths but converts only light having specific light frequencies corresponding to the frequency of an electrical signal input to the AOMC 110 into a second mode. The MP 120 is hardly affected by a light frequency of light.

Thus, a notch filter can be formed using the AOMC 110 and the MS 120 shown in FIG. 1. The frequency of the electric signal input to the AOMC 110 can be adjusted so as to realize an acousto-optic tunable filter (AOFT) 100.

Figure 2:
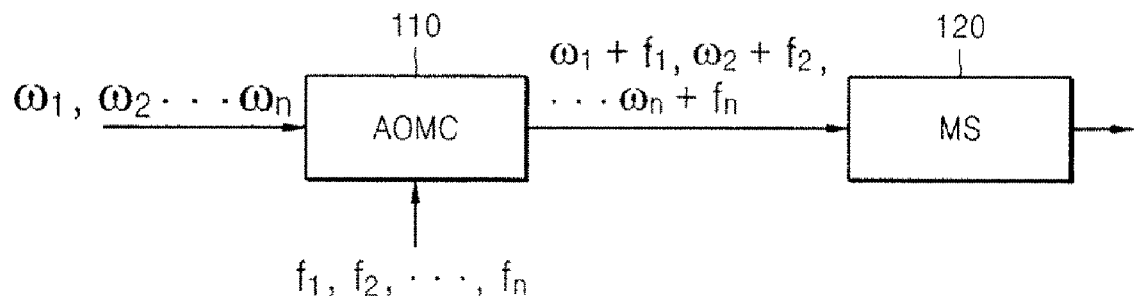
FIG. 2 is a view illustrating a process of applying an electric signal having several frequencies to the acousto-optic filter shown in FIG. 1.

FIG. 2 is a view illustrating a process of applying an electric signal having several frequencies to the acousto-optic filter shown in FIG. 1. Referring to FIG. 2, if an electric signal having several frequencies is applied to the AOMC 110 simultaneously, only an optical signal having an optical frequency corresponding to each of the frequencies of the electric signal is frequency and mode converted.

In other words, if light having optical frequencies of $\omega_1$, $\omega_2$, ..., and $\omega_n$ and an electric signal having frequencies of $f_1$, $f_2$, $f_4$, $f_5$, ..., and $f_n$ are input, the light having optical frequencies of $\omega_1$, $\omega_2$, ..., and $\omega_n$ is converted into light having optical frequencies of $\omega_1+f_1$, $\omega_2+f_1$, ..., and $\omega_n+f_1$, and a mode is converted into a second mode.

Figure 3A:
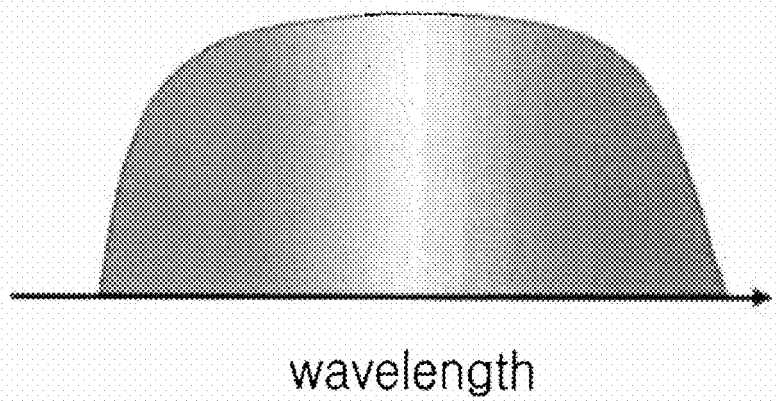
FIG. 3A is a view illustrating a spectrum of light having a wide line width.
Figure 3B:
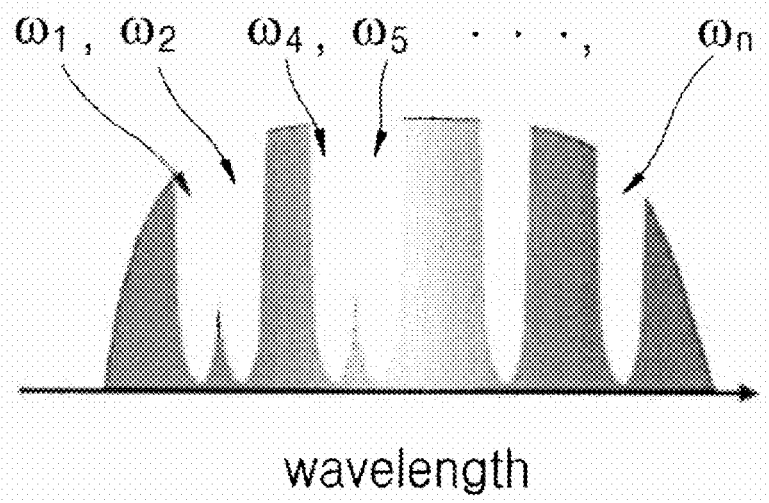
FIG. 3B is a view illustrating a spectrum of the light of FIG. 3A applied to an acousto-optic filter.

If light having a broadband wavelength as shown in FIG. 3A is input to the AOMC 110 of the acousto-optic filter shown in FIG. 1 and an electric signal having frequencies of $f_1$, $f_2$, $f_4$, $f_5$, ..., $f_n$ are applied to the AOMC 110, a transmission characteristic as shown in FIG. 3B can be obtained.

Figure 4:
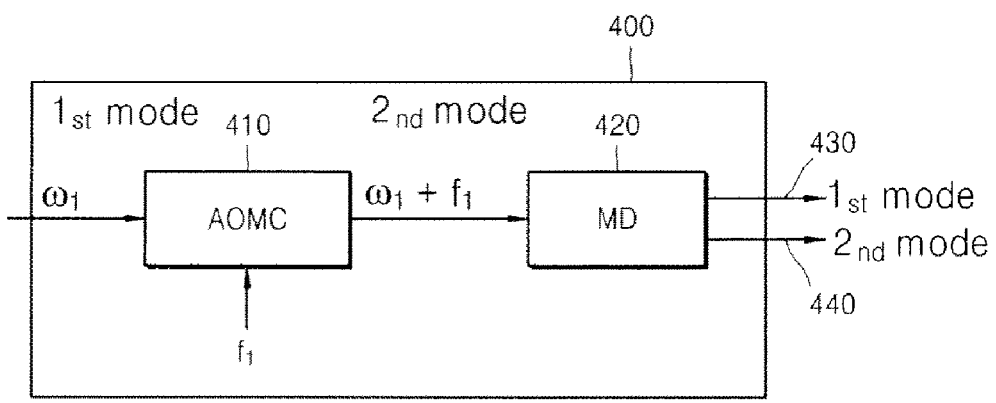
FIG. 4 is a view illustrating an acousto-optic filter used for an optical CDMA decoder according to an embodiment of the present invention.

FIG. 4 is a view illustrating an acousto-optic filter used for an optical CDMA decoder according to an embodiment of the present invention. Referring to FIG. 4, an acousto-optic filter 400 used for an optical CDMA decoder includes an AOMC 410 and a mode divider (MD) 420.

If light input to the AOMC 410 is a fundamental mode having an optical frequency of $\omega_1$ and a frequency of an electric signal input to the AOMC 410 is $f_1$, the AOMC 410 converts the input light into an optical frequency of $\omega_1+f_1$ and a mode into a second mode.

The frequency $f_1$ is very smaller than the frequency $\omega_1$ as described with reference to FIG. 1, and thus the frequency $f_1$ can be disregarded.

The MD 420 divides the mode into a fundamental mode and the second mode and then outputs them to different ports. In other words, if the MD 420 receives the light from the AOMC 410, the MD 420 outputs light having the optical frequency of $\omega_1$ to a port 430 and light having a different optical frequency to a port 440, Similar to the MS 120 shown in FIG. 1, the MD 420 is hardly affected by an optical frequency. Thus, the AOMC 410 and the MD 420 can be constituted as shown in FIG. 4 so as to be used as decoders.

Figure 5:
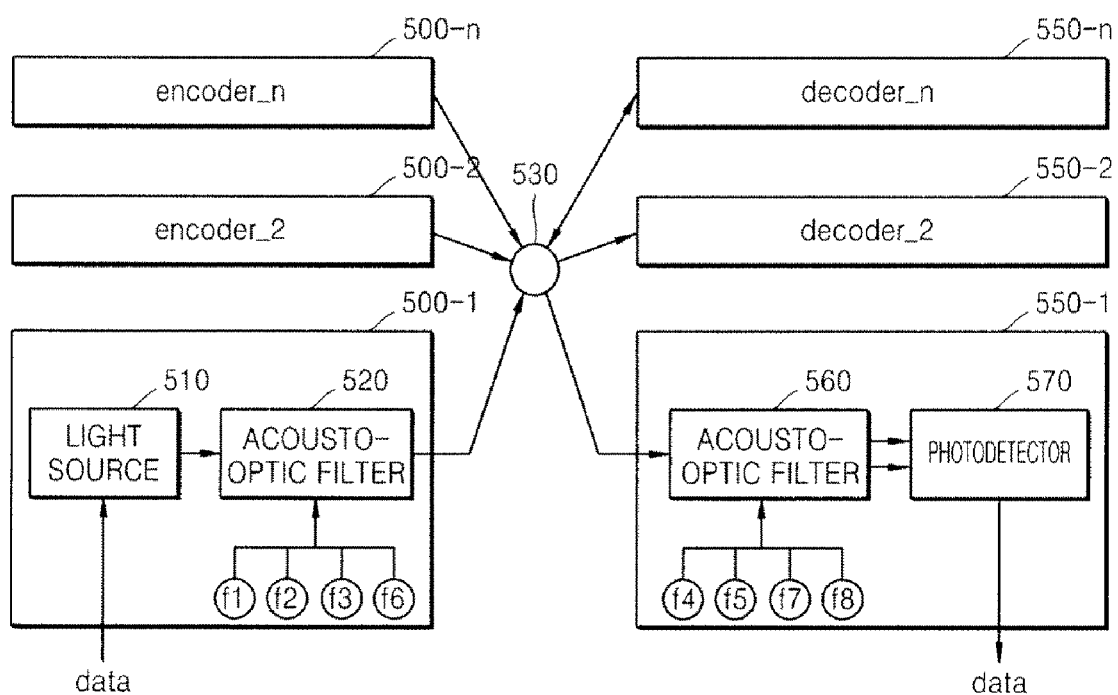
FIG. 5 is a view illustrating an optical CDMA system using an acousto-optic filter according to an embodiment of the present invention.

FIG. 5 is a view illustrating an optical CDMA system using an acousto-optic filter according to an embodiment of the present invention. Referring to FIG. 5, the optical CDMA system includes a plurality of optical CDMA encoders 500-1, 500-2, and 500-n including acousto-optic filters 520 as shown in FIG. 1 and a plurality of optical CDMA decoders 550-1, 550-2, and 550-n including acousto-optic filters as shown in FIG. 4

Light output from broadband light sources 510 is input to the acousto-optic filter 520 including the AOMC 110 and the MS 120.

If electric signals having frequencies (for example, $f_1$, $f_2$, $f_3$, and $f_6$) corresponding to specific channels are summed and then to applied to the acousto-optic filters 520, only optical signals having optical frequencies except optical frequencies $\omega_1$, $\omega_2$, $\omega_3$, and $\omega_6$ corresponding to $f_1$, $f_2$, $f_3$, and $f_6$ are transmitted so as to perform encoding in a wavelength region. Different frequencies are respectively allocated to the encoders 500-1, 500-2, and 500-n. Light encoded and output from the encoders 500-1, 500-2, and 500-n is coupled by an optical coupler 530 and then incident on the decoders 550-1, 550-2, and 550-n.

In a case where a decoder has a complementary code to a frequency allocated to an encoder, each of balanced photodetectors (BPDs) 570 detects light signals from two output ports of each of the acousto-optic filters 560 and outputs the signal corresponding to the power difference between two light signals.

In a case where the decoder does not have the complementary code to the frequency allocated to the encoder, light is divided and then incident on the two ports of each of the BPDs 570, because matched and mismatched signals with AOMC 410 characteristics are extracted to the first mode and second mode output ports, respectively. Thus, a signal transmitted from another channel is offset so that the BPDs 570 having a balanced detector structure does not detect signals. As a result, an optical CDMA system having a simple structure can be constituted As described above, according to the present invention, a simple encoder and/or decoder can be constituted using an acousto-optic filter in a wavelength domain optical CDMA. Also, a variable encoder and/or decoder can be constituted to adjust an optical transceiver channel so as to improve efficiency of communication traffic of an optical communication system.

Differently from a conventional optical CDMA encoder and/or decoder controlling an optical element, a frequency of an electric signal applied to an acousto-optic filter can be adjusted to adjust a channel. Thus, the simple encoder and/or decoder are advantageous in terms of cost and operation. As a result, the simple encoder and decoder can be very useful to an optical communication network and optical communications requiring security.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical CDMA system using an acousto-optic filter, comprising:
    at least one or more optical CDMA encoders outputting only an optical signal except an optical signal having a specific optical frequency corresponding to a frequency of an electric signal using an acousto-optic filter performing acousto-optic mode converting and mode stripping;
    an optical coupler coupling optical signals output from a plurality of optical CDMA encoders; and
    an optical CDMA decoder dividing the optical signals received from the optical coupler into a specific optical frequency corresponding to a predetermined frequency of an electric signal and outputting the divided optical signal using an acousto-optic filter performing acousto-optic mode converting and mode divider.

2. The optical CDMA system of claim 1, wherein the optical CDMA encoder comprises:
    a light source generating an optical signal of a first mode having a broadband; and
    an acousto-optic filter converting an optical signal having an optical frequency corresponding to a predetermined frequency of the electric signal into a second mode and then outputting an optical signal except an optical signal of the second mode.

3. The optical CDMA system of claim 1, wherein the optical CDMA decoder comprises:

an acousto-optic filter converting an optical signal having an optical frequency corresponding to a predetermined frequency of an electric signal into a second mode and then dividing and outputting the optical signal of the first mode and the optical signal of the second mode; and a BPD (balanced photodetector) detecting the optical signals of the first and second modes and outputting the signal corresponding to the power difference between two light signals.

* * * * *